US011077799B2

(12) United States Patent
Sinelli et al.

(10) Patent No.: US 11,077,799 B2
(45) Date of Patent: Aug. 3, 2021

(54) SINGLE ARM TELESCOPING MIRROR

(71) Applicant: SMR Patents S.à.r.l., Luxembourg (LU)

(72) Inventors: Gary Sinelli, Troy, MI (US); Paul Henion, Troy, MI (US)

(73) Assignee: SMR Patents S.à.r.l., Luxembourg (LU)

(*) Notice: Subject to any disclaimer, the term of this patent is extended or adjusted under 35 U.S.C. 154(b) by 194 days.

(21) Appl. No.: 16/530,553

(22) Filed: Aug. 2, 2019

(65) Prior Publication Data

US 2019/0351826 A1 Nov. 21, 2019

Related U.S. Application Data

(63) Continuation-in-part of application No. 15/442,119, filed on Feb. 24, 2017, now Pat. No. 10,369,930.

(51) Int. Cl.
| | |
|---|---|
| *B60R 1/02* | (2006.01) |
| *B60R 1/078* | (2006.01) |
| *B60R 1/07* | (2006.01) |
| *B60R 11/00* | (2006.01) |

(52) U.S. Cl.
CPC ............. *B60R 1/078* (2013.01); *B60R 1/07* (2013.01); *B60R 2011/0084* (2013.01)

(58) Field of Classification Search
CPC .. B60R 1/078; B60R 1/07; B60R 1/06; B60R 2011/0084
USPC ......... 248/476; 359/871, 872, 874, 875, 877
See application file for complete search history.

(56) References Cited

U.S. PATENT DOCUMENTS

| | | | |
|---|---|---|---|
| 6,116,743 A * | 9/2000 | Hoek | B60R 1/078 |
| | | | 359/871 |
| 6,239,928 B1 | 5/2001 | Whitehead et al. | |
| 6,276,805 B1 * | 8/2001 | Home | B60R 1/06 |
| | | | 248/476 |
| 6,416,192 B2 | 7/2002 | Home et al. | |
| 6,505,943 B1 | 1/2003 | Olijnyk et al. | |
| 6,582,087 B2 | 6/2003 | Whitehead et al. | |
| 6,592,231 B2 | 7/2003 | Home et al. | |
| 10,369,930 B2 * | 8/2019 | Sinelli | B60R 1/078 |
| 2008/0024891 A1 | 1/2008 | Ruse et al. | |

(Continued)

FOREIGN PATENT DOCUMENTS

WO   WO-2005073038 A1 *  8/2005  ............. B60R 1/078

OTHER PUBLICATIONS

Chinese Office Action dated Sep. 27, 2020 of Chinese application No. 201810155518.0.

*Primary Examiner* — Todd M Epps
(74) *Attorney, Agent, or Firm* — Jones Day (57) ABSTRACT

A single arm telescoping mirror apparatus comprising a mirror base and mirror head. In one embodiment, a mirror base having a wear plate secured to a single support arm which frictionally engages a single telescoping tube of the mirror head. Furthermore, a mirror base having a roller assembly which frictionally engage the inner wall of a single telescoping tube of the mirror head. Frictional forces created minimize the telescopic or vibrational movement of the mirror head during use of a vehicle. In another aspect, a wear plate is secured to a single telescoping tube while, roller assemblies are attached to a support arm which frictionally engage ridges of the telescoping tube.

24 Claims, 6 Drawing Sheets

(56) References Cited

U.S. PATENT DOCUMENTS

2014/0063233 A1 3/2014 Henion et al.
2017/0080863 A1* 3/2017 Henion .................... B60R 1/12

* cited by examiner

SINGLE ARM TELESCOPING MIRROR

CROSS-REFERENCE TO RELATED APPLICATION

This application is a continuation-in-part of U.S. patent application Ser. No. 15/442,119, filed Feb. 24, 2017, which is hereby incorporated by reference in its entirety for all purposes.

BACKGROUND OF THE INVENTION

1. Field of the Invention

The following description relates to the art of vehicle rear view mirrors and, for example, to mirrors that can be adjusted to extend varying distances outwardly from the side of a vehicle.

2. Related Art

Telescoping mirror assemblies desirably are maintained in their adjusted position against unintentional movement. In addition, reduced vibrations are desired in telescoping mirror assemblies to improve clarity and visibility of objects seen in the reflection of the mirror. During operation of a wide variety of vehicles, including but not limited to automobiles, watercrafts, and off-road vehicles, uneven surfaces or turbulence cause the vehicles to often vibrate and shake. These abrupt motions cause telescoping mirrors to vibrate and either extend or retract from their set position As a result, there is a need for a rear view mirror assembly with improved structural integrity.

SUMMARY

A single arm telescoping mirror apparatus having a mirror head and mirror base. The mirror base including a single support arm extending from a pivot which is attached to the mirror base and secured to a vehicle. Attached to the support arm is a wear plate and roller assemblies which facilitate frictional resistance of the support arm when assembled into the mirror head. The mirror head having a telescoping tube with one or more ridges which is constructed and arranged to receive the support arm of the mirror base. The telescoping tube having an upper and lower flange which attach the tube to the mirror case frame.

In certain embodiments of the present invention the wear plate is attached to the telescoping tube of the mirror head. In these embodiments the wear plate provides frictional resistance against the support arm of the mirror base. The rollers assemblies are attached to the support arm and provide frictional resistance against the telescoping tube.

DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "corner," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Figure 1:
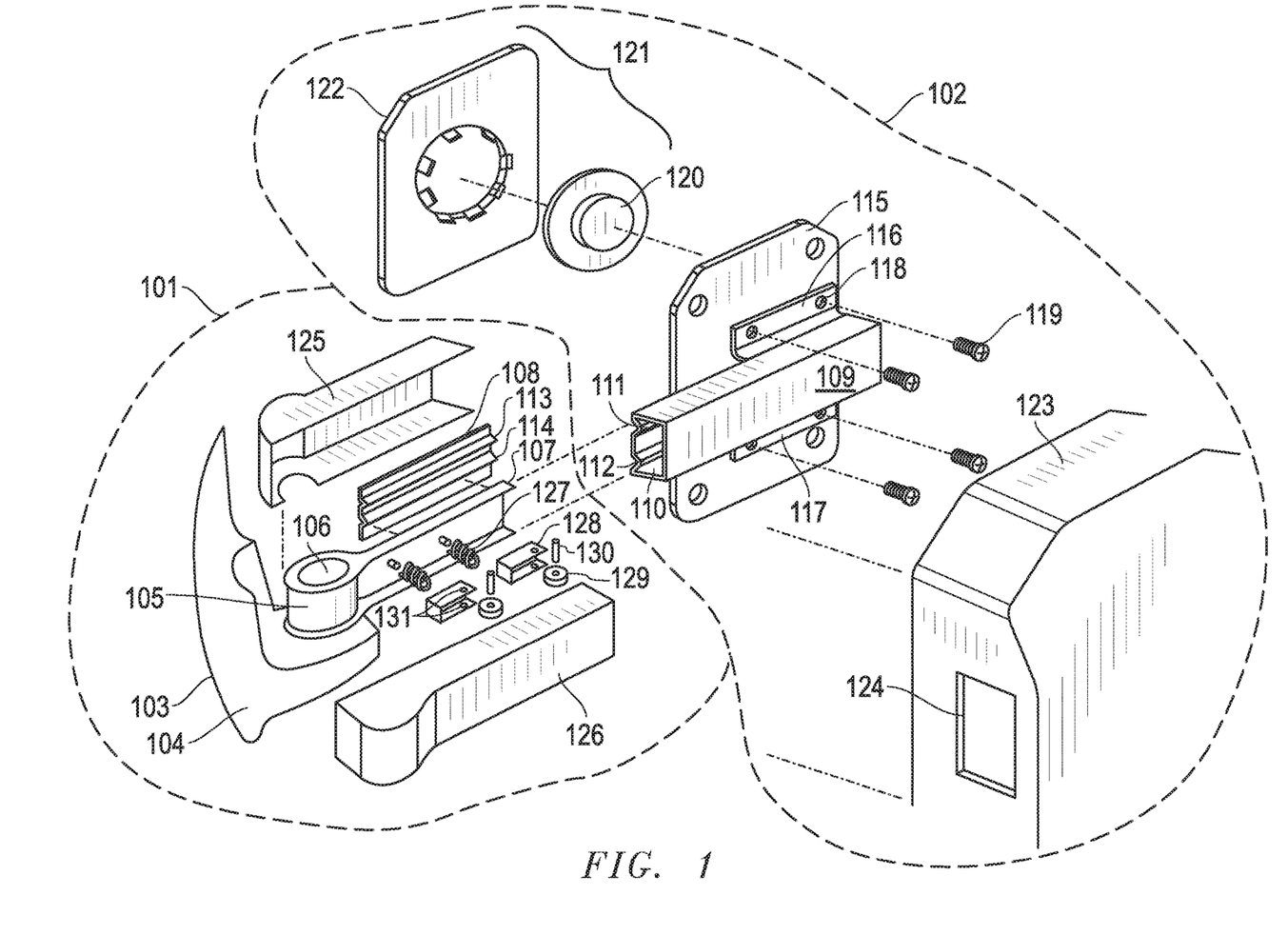
FIG. 1 is an expanded view of an embodiment of a telescoping mirror assembly.

FIG. 1 is a diagram illustrating an expanded view of an embodiment of a telescoping mirror assembly comprising mirror base 101 and mirror head 102. Referring to FIG. 1, mirror base 101 comprises a base frame 103 and a base cover 104. Base frame 103 is attached to a vehicle by an suitable means known in the art. Base frame 103 is attached to pivot arm 105 by means of pivot 106. Pivot arm 105 comprises a support arm 107 which extends from pivot 106. Attached to support arm 107 is wear plate 108. In some embodiments, the wear plate 108 can be made of plastic, including, but not limited to, polyethylene terephthalate, high-density polyethylene, low-density polyethylene, polypropylene, acetal homopolymer, Nylon or a similar material. Further attached to support arm 107 are friction roller assemblies comprising of roller spring 127, roller cage 128, roller 129, and roller pin 130. In some embodiments, roller 129 is secured into roller cage 128 by inserting roller pin 130 through roller aperture 131. FIG. 1 depicts two roller assemblies, but it should be understood that a greater or fewer number of roller assemblies can be used in the present invention.

When support arm 107 is assembled into telescoping tube 109 roller spring 127 pushes roller cage 128 and roller 129 against the inner wall of telescoping tube 109. Similarly, roller spring 127 also pushes support arm 107 and wear plate 108 against the opposite side of telescoping tube 109 including ridges 111 and 112. This causes frictional resistance between telescoping tube 109 and support arm 107, which minimizes the telescopic movement and vibration of mirror head 102. Support arm 107, wear plate 108 and friction roller assemblies are secured inside of arm covers 125 and 126, by any suitable means known in the art.

Mirror head 102 includes telescoping tube 109 which further includes upper flange 116 and lower flange 117. Upper flange 116 and lower flange 117 include mounting holes 118 wherein the telescoping tube 109 can be can be mounted to mirror case frame 115. FIG. 1 illustrates an embodiment where telescoping tube 109 can be mounted to case frame 115 by means of mounting holes 118 and screws 119, but it should be understood that any suitable means for mounting can be used, including but not limited to welding, gluing, or securing by snap. Telescoping tube 109 also includes ridges 111 and 112, which wear plate 108 slides along during extension or retraction of mirror head 102. Wear plate 108 includes ridges 113 and 114, which when assembled, interact with ridges 111 and 112 on telescoping tube 109 to create frictional resistance while still allowing the telescoping tube to extend or retract.

Also attached to case frame 115 is glass assembly 121, including mirror glass, and glass holder assembly 122, and glass actuator 120. When mirror base 101 and mirror head 102 are assembled arm covers 125 and 126 extend into mirror case 123 through aperture 124. When the mirror head assembly 102 is in the retracted position, a greater portion of arm covers 125 and 126 are within mirror case 123. When the mirror head assembly 102 is in the extended position a lesser portion of arm covers 125 and 126 are within mirror case 123.

In at least one aspect, one advantage of the described mirror is that even when telescoping tube 109 is in the extended position there is increased structural contact between the support arm 107 and telescoping tube 109, and therefore mirror base 101 and 102, minimizes undesired vibration or telescopic movement of the mirror head 101.

Figure 2:
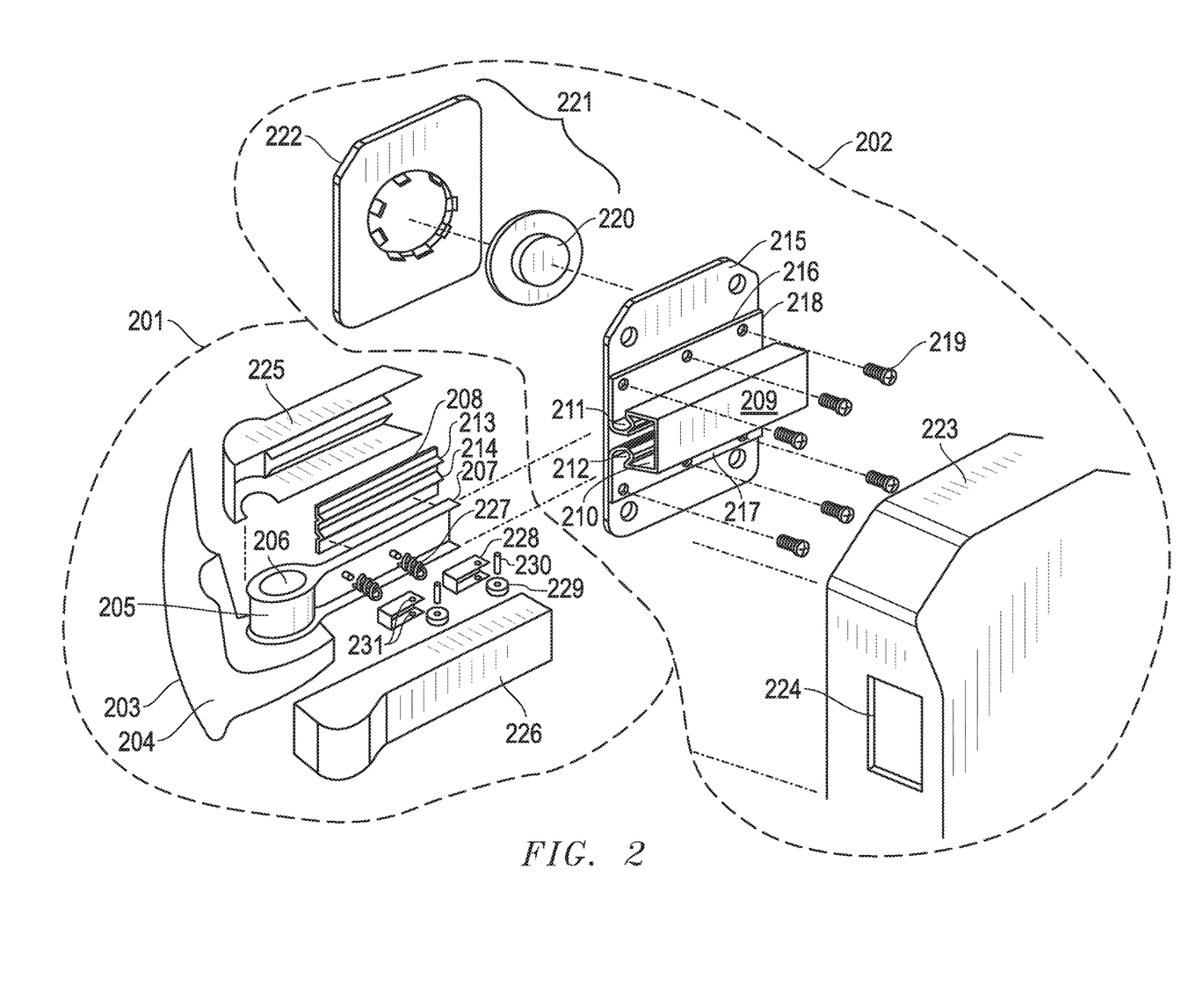
FIG. 2 is an expanded view of a second embodiment of a telescoping mirror assembly.

FIG. 2 is a diagram illustrating an expanded view of another embodiment of a telescoping mirror assembly comprising mirror base 201 and mirror head 202. Referring to FIG. 2, mirror base 201 comprises a base frame 203 and a base cover 204. Base frame 203 is attached to a vehicle by any suitable means known in the art. Base frame 203 is attached to pivot arm 205 by means of pivot 206. Pivot arm 205 comprises a support arm 207 which extends from pivot 206. Attached to support arm 207 is wear plate 208. In some embodiments, the wear plate 208 can be made of plastic, including, but not limited to, polyethylene terephthalate, high-density polyethylene, low-density polyethylene, polypropylene, acetal homopolymer, nylon or a similar material.

Further attached to support arm 207 are friction roller assemblies comprising of roller spring 227, roller cage 228, roller 229, and roller pin 230. In some embodiments, roller 229 is secured into roller cage 228 by inserting roller pin 230 through roller aperture 231. FIG. 2 depicts two roller assemblies, but it should be understood that more or fewer roller assemblies can be used in the present invention.

When support arm 207 is assembled into telescoping tube 209 roller spring 227 pushes roller cage 228 and roller 229 against the inner wall of telescoping tube 209. Similarly, roller spring 227 also pushes support arm 207 and wear plate 208 against the opposite side of telescoping tube 209 including ridges 211 and 212. This causes frictional resistance between telescoping tube 209 and support arm 207, which minimizes the telescopic movement and vibration of mirror head 202. Support arm 207, wear plate 208 and friction roller assemblies are secured inside of arm covers 225 and 226, by any suitable means known in the art.

Mirror head 202 includes telescoping tube 209 which further includes upper flange 216 and lower flange 217. Telescoping tube 209 is constructed such that there is an aperture between ridges 211 and 212. The material, which in some embodiments can be metal, plastic or composite, is constructed such that a side of telescoping tube 209 forms the upper flange 216 and lower flange 217 while creating an aperture between rides 211 and 212. Wear plate 208 includes ridges 213 and 214, which when assembled, interact with ridges 211 and 212 on telescoping tube 209 to create frictional resistance while still allowing the telescoping tube to extend or retract.

Upper flange 216 and lower flange 217 include mounting holes 218 wherein the support tube 209 can be can be mounted to case frame 215. FIG. 2 illustrates an embodiment where support tube 209 can be mounted to case frame 215 by means of mounting holes 218, but it should be understood that any suitable means for mounting can be used, including but not limited to welding, gluing, or securing by snaps.

Attached to case frame 215 is glass assembly 221, including mirror glass and glass holder assembly 222, and glass actuator 220. When mirror base 201 and mirror head 202 are assembled arm covers 225 and 226 extend into mirror case 223 through aperture 224. Arm covers 225 and 226 cover the upper, lower and forward portion of telescoping tube 229. Arm covers 225 and 226 also cover the reward portion of telescoping tube 209, but only partially and terminate at the ridges 211 and 212. This allows flange 216 and 217 to extend the full width of the case frame 215 providing greater structural strength.

When the mirror head assembly 202 is in the retracted position, a greater portion of arm covers 225 and 226 are within mirror case 223. When the mirror head assembly 202 is in the extended position a lesser portion of arm covers 225 and 226 are within mirror case 223.

In at least one aspect, one advantage of the described mirror is that even when telescoping tube 209 is in the extended position the increased structural contact between the support arm 207 and telescoping tube 209, and therefore mirror base 201 and 202, minimizes undesired vibration or telescopic movement of the mirror head 201.

Figure 3:
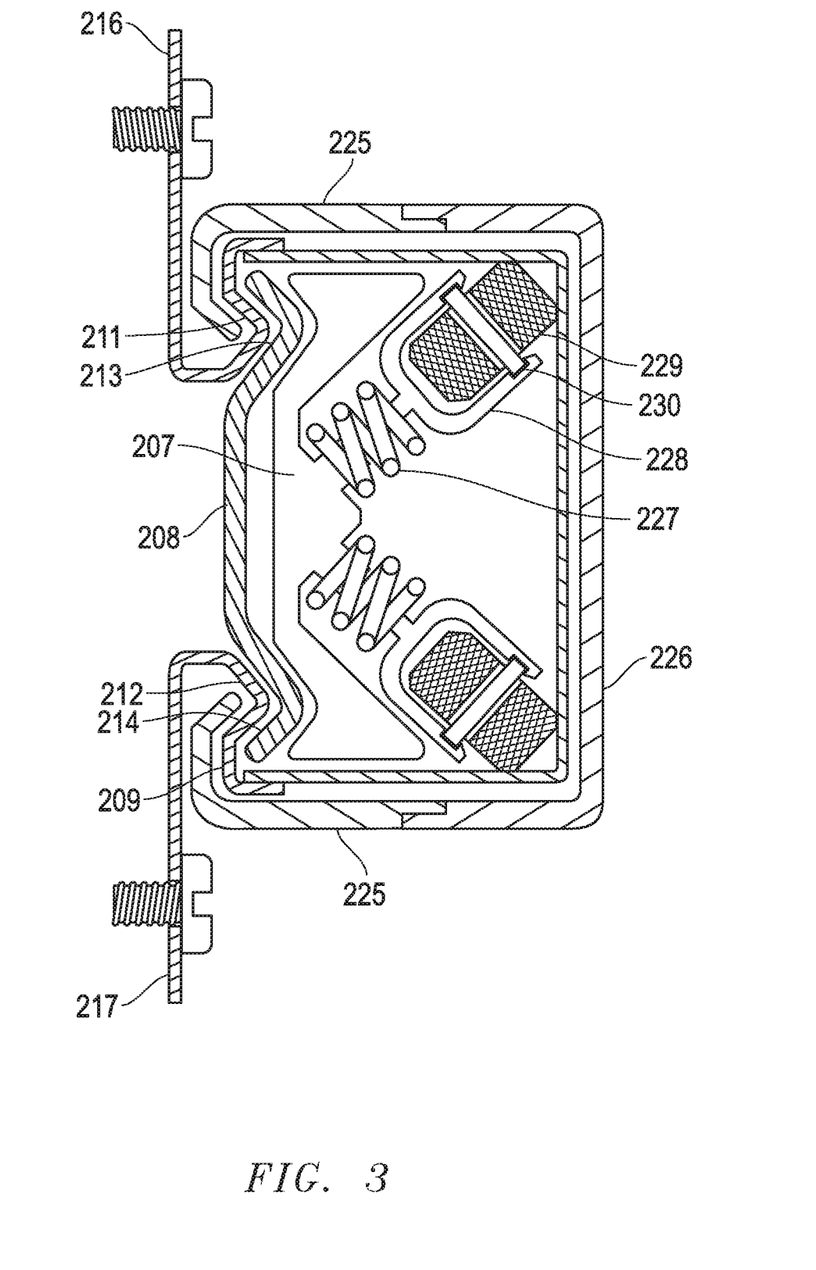
FIG. 3 is a sectional perspective view of a second embodiment of a telescoping mirror assembly.

FIG. 3 is a diagram illustrating a sectional perspective view of an embodiment of a telescoping mirror assembly. FIG. 3 illustrates a section view when the support arm 207 and telescoping tube 209 are within mirror case 223.

Secured to support arm 207 are the friction roller assemblies comprised of roller spring 227, roller cage 228, roller 229, and roller pin 230. Roller spring 227, as installed, is in a state of compression pressing against support arm 207 on one side which in turn presses support arm 207 against the wear plate 208 and ridges 211 and 212 of telescoping tube 209. The other side of roller spring 227 presses the roller cage 228 and roller 229 against the inner wall of telescoping tube 209. In his manner friction is created between support arm 207 and telescoping tube 209, which holds the telescoping tube 209 stationary.

During the extension of retraction of the telescoping tube 209, the wear plate 208 and support arm 207 frictionally slide over ridges 211 and 212, while rollers 229 roll along the inner wall corners of telescoping tube 209. FIG. 3 illustrates an embodiment where the rollers 229 are at an angle of approximately 45 degrees, said angle could vary within a range of approximately 30 degrees to 60 degrees, with respect to telescoping tube 209. In this embodiment the rollers 229 are in contact with both the vertical and horizontal inner wall of telescoping tube 209. This contact of the rollers to both the vertical and horizontal walls of the inner tube provide a greater degree of stability and frictional resistance. FIG. 3 shows an embodiment where two rollers are used, however it should be appreciated that more or less rollers can be used.

Figure 4:
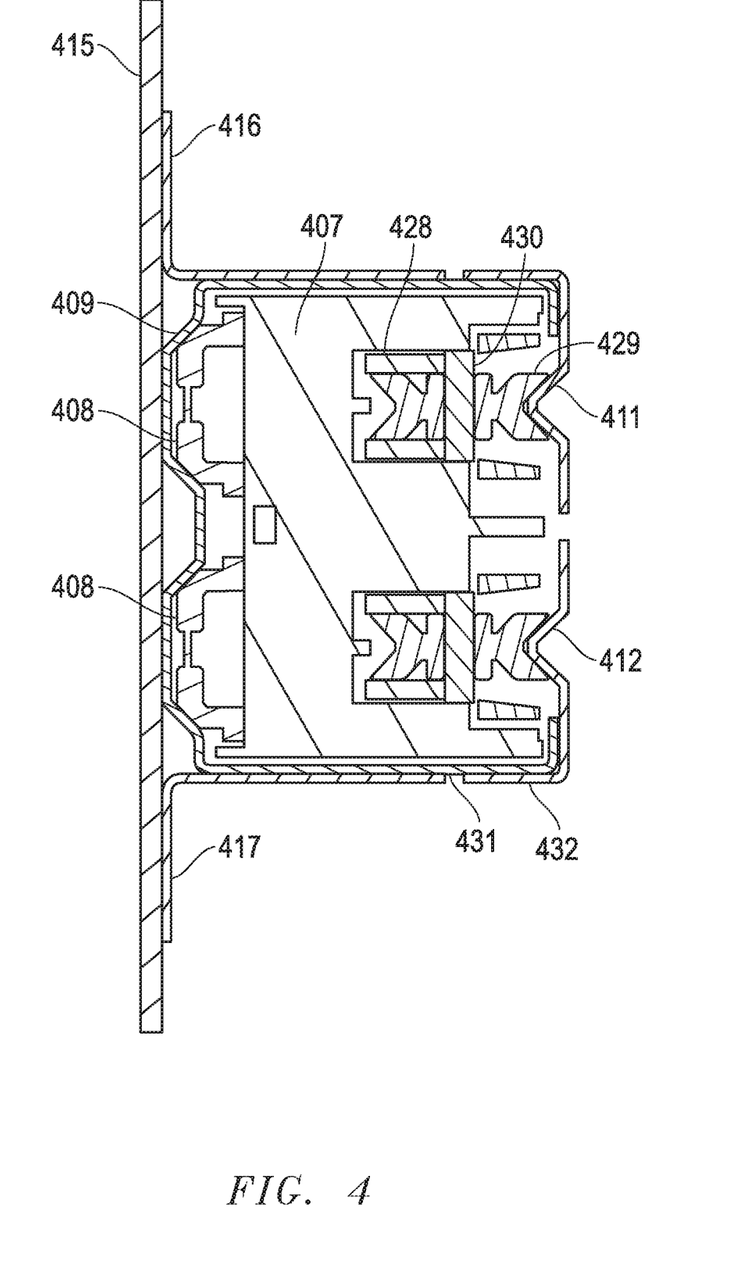
FIG. 4 is a sectional perspective view of the telescoping arm of a mirror assembly.

FIG. 4 is a diagram illustrating a sectional perspective view of the telescoping arm of a mirror assembly. FIG. 4 illustrates an embodiment wherein the rollers 429 frictionally engage ridges 411 and 412. In this embodiment wear plate 408 is attached to telescoping tube 409. In some embodiments, wear plate 408 can be made of more than one piece of plastic or similar material.

Secured to support arm 407 are the friction roller assemblies comprised of the roller spring 427, roller cage 428, roller 429, and roller pin 430. Roller spring 427, as installed, is in a state of compression pressing against support arm 407 on one side which in turn presses support arm 407 against the wear plate 408. The other end of roller spring 427 presses the roller cage 428 and roller 429 against the ridges 411 and 412 of wall telescoping tube 409. During extension or retraction, support arm 407 frictionally slides over wear plate 408 while rollers 429 roll along ridges 411 and 412. In this manner, friction is created between the support arm 407 and telescoping tube 409 which holds the telescoping tube 409 stationary. In this embodiment, the telescoping tube 409 is made of two separate segments, 431 and 432. Tube segments 431 and 432 are bonded together with welding, however, these may be glued, snapped or secured together by any suitable means. Upper flange 416 and lower flange 417 are also welded to tube segment 431, however, these may also be glued, snapped or secured together by any suitable means.

Figure 5:
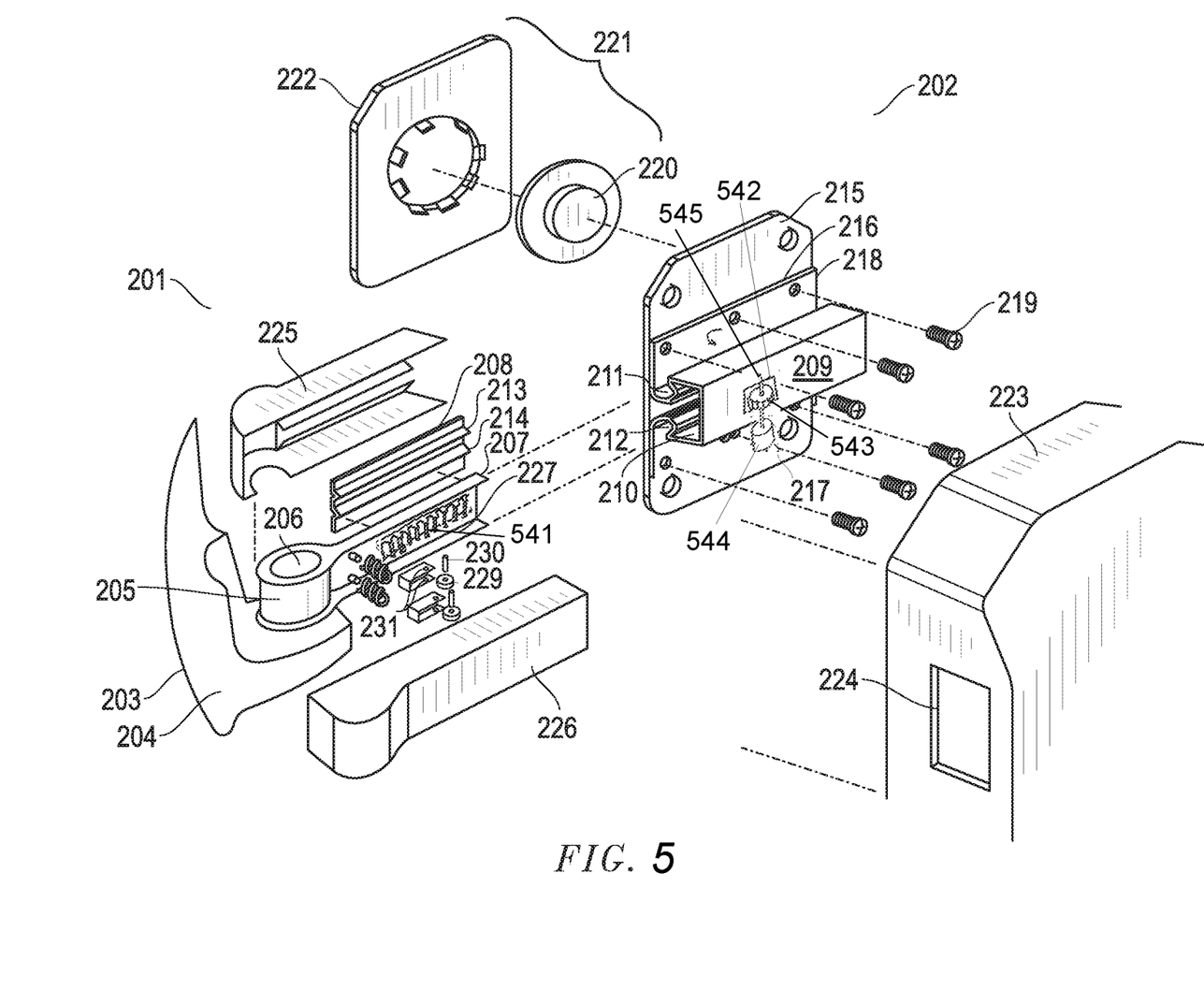
FIG. 5 is an expanded view of a third embodiment of a telescoping mirror assembly.

FIG. 5 is an expanded view of a third embodiment of a telescoping mirror assembly including a motor 544. Referring to FIG. 5, this embodiment of a telescoping mirror assembly comprises a mirror base 201 and a mirror head 202 which is almost identical to the mirror assembly of FIG. 2. For efficiency, all parts already described for the mirror assembly of FIG. 2 will not be described again; reference is made to the description already provided above with respect to these parts. In this example, most components are the same except that gear teeth 541 are added to the support arm 207 of this mirror assembly of FIG. 2. An access hole 542 is added to the telescoping tube 209. With the mirror head 202 in an assembled position, the access hole 542 provides an opening for gear teeth 541. Motor 544 provides power that turns shaft 545 and gear 543. Gear 543 interacts with gear teeth 541. As a result, when motor 544 rotates shaft 545 and gear 543, it interacts with gear teeth 541 causing the mirror head 202 to move outward or inward depending on the rotation of the shaft 545.

Figure 6:
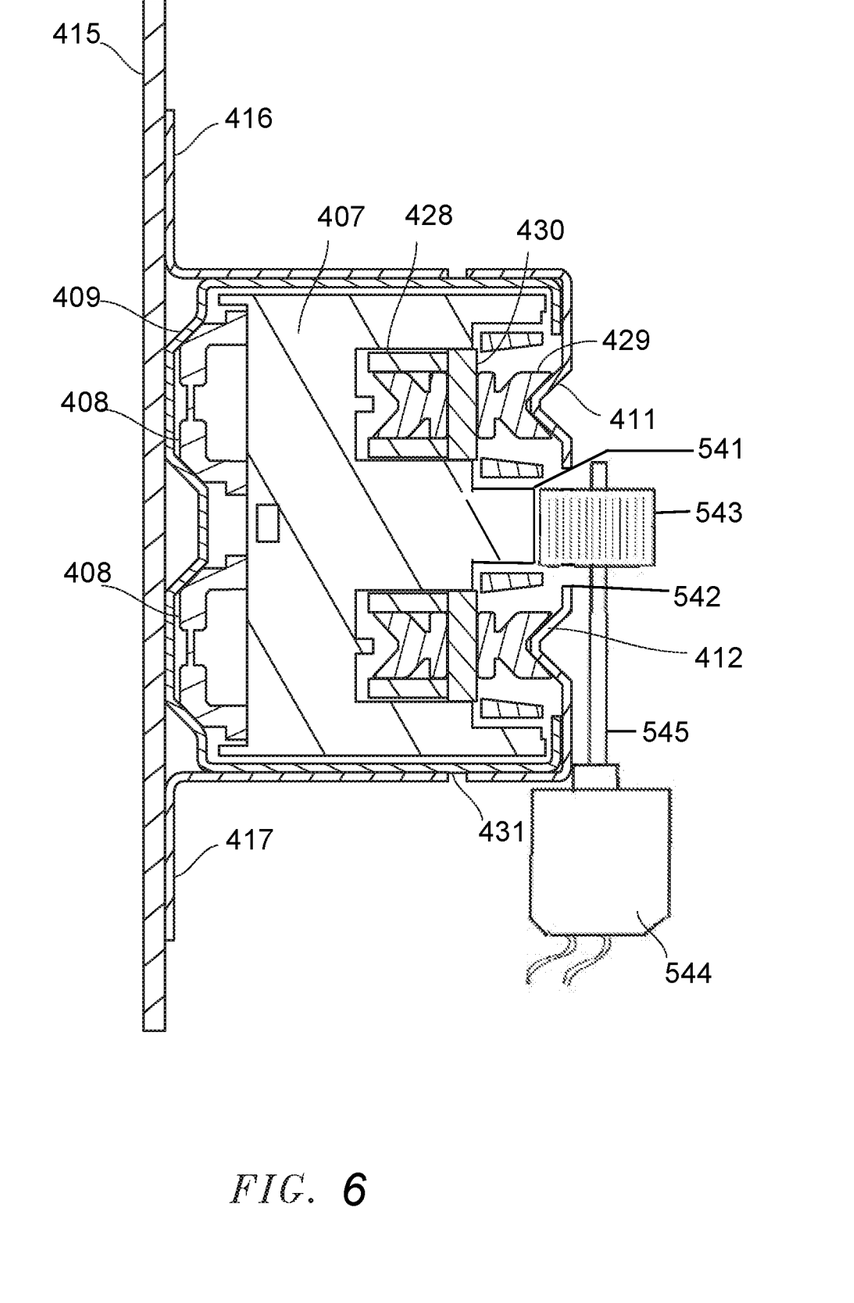
FIG. 6 is a sectional perspective view of another telescoping arm of a mirror assembly.

FIG. 6 is a sectional perspective view of another telescoping arm of a mirror assembly including a motor 544. Referring to FIG. 6, this embodiment of a telescoping arm is almost identical to the telescoping arm of FIG. 4 which illustrates an embodiment where the rollers 429 frictionally engage ridges 411 and 412. For efficiency, all parts already described for the telescoping arm of FIG. 4 will not be described again; reference is made to the description already provided above with respect to these parts. In this example, most components are the same except that gear teeth 541 are added to the support arm 407 of the assembly of FIG. 4. An access hole 542 is added to the telescoping tube 409. The access hole 542 provides an opening for gear teeth 541. Motor 544 provides power that turns shaft 545 and gear 543. Gear 543 interacts with gear teeth 541 on the support arm 407. As a result, when motor 544 rotates shaft 545 and gear 543, it interacts with gear teeth 541 causing the mirror head to move outward or inward depending on the rotation of the shaft 545.

Referring back to FIGS. 5 and 6 together, in either example, the mirror assembly may also include intermediate gears positioned between the shaft 545, the gear 543 and the gear teeth 541 in order to provide an additional reduction in RPM to achieve greater control in electrical adjustment of the telescoping action.

Further, in an example, gear 543 may be a solid gear or it may have an internal clutch mechanism which allows the outer portion of the gear to spin separately from the shaft 545 when a manual external force is applied to the mirror head to manually move it inward or outward. The gear teeth 541 may also be integrated into the front side of the wear plate 208, 408 which is fixedly secured to the support arm 207, 407. In this example, the access hole 542 would need to be present on the front side of the wear plate 208, 408 along with the motor 544, shaft 545, and gear 543.

The apparatus of the present invention has been described above and in the attached drawings; however, such description is for illustration purposes only, and it is to be understood that changes and variations may be made without departing from the spirit or scope of the following claims.

What is claimed is:

1. A rear view mirror assembly, comprising:
    a mirror base that is fixedly secured to a vehicle and comprising a pivoting arm member extending away from a mirror pivot, the pivoting arm comprising gear teeth on a surface thereof; and
    a mirror head comprising a non-round telescoping tube that receives the pivoting arm member and allows lateral movement of the mirror head along an axis of the pivoting arm member, the mirror head comprising a motor assembly,
    wherein the telescoping tube provides selective adjustment of a position of the mirror head with respect to the mirror base.

2. The assembly of claim 1, further comprising two roller assemblies.

3. The assembly of claim 2, wherein the roller assemblies are orientated at a 45 degree angle with respect to the telescoping tube.

4. The assembly of claim 1, further comprising a wear plate that includes two ridges.

5. The apparatus of claim 4, wherein the telescoping tube comprises two ridges.

6. The apparatus of claim 5, further comprising an aperture in the telescoping tube between the two ridges.

7. The assembly of claim 1, wherein the pivoting arm member and the telescoping tube are substantially rectangular.

8. The assembly of claim 1, further comprising two wear plates.

9. The apparatus of claim 1, further comprising an upper and lower flange which extend the full length of the telescoping tube.

10. The apparatus of claim 1, wherein the telescoping tube comprises two tube segments.

11. The apparatus of claim 1, wherein the motor assembly comprises a gear for interacting with the gear teeth, a motor shaft for rotating the gear, and a motor for rotating the motor shaft.

12. The apparatus of claim 11, wherein the telescoping tube comprises an opening through which the gear extends in order to interact with the gear teeth.

13. A single arm telescoping mirror apparatus, comprising:
　a mirror base, comprising:
　　a support arm comprising gear teeth on a surface thereof,
　　a wear plate with one or more ridges secured to the support arm, and
　　one or more roller assemblies; and
　a mirror head, comprising:
　　a non-round telescoping tube constructed and arranged to frictionally interact with the one or more roller assemblies, that comprises one or more ridges constructed and arranged to frictionally interact with the wear plate; and
　　a motor assembly comprising a gear for interacting with the gear teeth, a motor shaft for rotating the gear teeth, and a motor for rotating the motor shaft.

14. A single arm telescoping mirror apparatus, comprising:
　a mirror base, comprising:
　　a single support arm comprising gear teeth on a surface thereof, and
　　one or more roller assemblies; and
　a mirror head, comprising:
　　a non-round telescoping tube with one or more ridges constructed and arranged to interact with the one or more roller assemblies;
　　a wear plate secured to the telescoping tube constructed and arranged to interact with the single support arm; and
　　a motor assembly.

15. The apparatus of claim 14, wherein there are two roller assemblies.

16. The apparatus of claim 14, wherein the wear plate includes two ridges.

17. The apparatus of claim 14, wherein the support arm and the telescoping tube are substantially rectangular.

18. The apparatus of claim 14, wherein the wear plate comprise two wear plates.

19. The apparatus of claim 14, wherein the telescoping tube comprises two ridges.

20. The apparatus of claim 19, further comprising an aperture in the telescoping tube between the two ridges.

21. The apparatus of claim 20, further comprising an upper and lower flange which extend the full length of the telescoping tube.

22. The apparatus of claim 14, wherein the telescoping tube comprises two tube segments.

23. The apparatus of claim 14, wherein the motor assembly comprises a gear for interacting with the gear teeth, a motor shaft for rotating the gear, and a motor for rotating the motor shaft.

24. The apparatus of claim 23, wherein the telescoping tube comprises an opening through which the gear extends in order to interact with the gear teeth.

\* \* \* \* \*